3,173,889
ADHESIVES
Edwin E. Sylvester, Danvers, and Sumner H. Peck, Wakefield, Mass., assignors to United Shoe Machinery Corporation, Boston, Mass., a corporation of New Jersey
No Drawing. Filed June 15, 1960, Ser. No. 36,133
6 Claims. (Cl. 260—32.8)

This invention relates to adhesives and particularly to heat resistant adhesives capable of forming bonds to a wide variety of materials.

High molecular weight polyvinyl alkyl ethers have a degree of rubbery elasticity. This property, together with the relatively chemical inertness and age resistance, and the ability to adhere to a variety of materials have caused the polyviny alkyl ethers to be used as a base for adhesives and coatings. However, the polyvinyl alkyl ethers are soft and do not band properly on a compounding mill so that it has not been possible to reinforce them by milling in solid reinforcing agents such as mineral fillers. Fillers simply stirred into polyvinyl alkyl ether solutions settle out on standing and may be difficult to redisperse. Consequently adhesives and coatings heretofore obtained have been lacking in strength and resistance to deformation and rupture at only moderately elevated temperatures. In other words, the adhesives and coatings have had poor cold flow resistance.

It is an object of the present invention to provide cold flow resistant adhesives and coatings based on polyvinyl alkyl ethers.

To this end and in accordance with a feature of the present invention, an organic solvent soluble but substantially infusible compound is added to polyvinyl alkyl ether solution coating or adhesive compositions. The added compound reinforces the polyvinyl alkyl ether after evaporation of solvent from the composition to give much the same effect as would addition of mineral fillers.

The adhesive or coating composition of the present invention is a volatile organic solvent solution of a 2 to 4 carbon atom polyvinyl alkyl ether together with a substantial proportion of the organic solvent soluble substantially infusible reaction product of a metal oxide with a heat advancing, oil soluble, alkali catalyzed condensate of a parasubstituted phenol with formaldehyde in excess of the stoichiometric proportion.

The polyvinyl alkyl ether which forms the base of the present adhesive is preferably a relatively high molecular weight material. The alkyl group of the polymer may have an even number of carbon atoms in the range of 2 to 4; but polyvinyl ethyl ethers are the preferred materials.

"Reduced viscosity" is a measure of molecular weight and is defined as the figure obtained by dividing the specific viscosity by the concentration, in grams per 100 ml. of solvent, of a solution of a resin.

Specific viscosity $N_{sp}=$
$$\frac{\text{Viscosity of solution } N_s - \text{viscosity of solvent } N_o}{\text{viscosity of solvent } N_o}$$

Using a solution in benzene at 20° C. and determining viscosity by means of a Brookfield Viscometer, it has been found that the preferred polyvinyl alkyl ethers for use in the present adhesive have reduced viscosities of from 3 to 6. Examples of useful commercial resin include "Vinylite" EDBL, which is a polyvinyl ethyl ether having a reduced viscosity of from 3 to 3.5, "Vinylite" EDBM, which is a polyvinyl ethyl ether having a reduced viscosity of from 3.5 to 4.5, and "Vinylite" EDBM having a reduced viscosity of from 4.5 to 6.

The reaction products for incorporation with polyvinyl alkyl ether in organic solvent solution are prepared by simply bringing together the selected metal oxide and a heat advancing, oil soluble, alkali catalyzed resin in solution in a volatile organic solvent. The reaction proceeds exothermically and is accompanied by a change in color of the resin solution. Suitable metal oxides are magnesium oxide and lead oxide.

The resins for reaction with the metal oxide are the products formed by condensation in the presence of an alkaline catalyst, for example, sodium hydroxide, of a parasubstituted phenol of which the substituent group is hydrocarbon containing at least three carbon atoms, with formaldehyde in proportion greater than one mol of formaldehyde to one mol of the substituted phenol. Suitable substituted phenols include paratertiary butyl phenol, para-amyl phenol, paraphenyl phenol, mixtures of these and other para-substituted phenols.

It is preferred to carry the reaction between the phenol formaldehyde condensate and the metal oxide to provide as high a content of combined metal as practicable. Where magnesium oxide is the metal oxide the reaction product preferably contains from about 7.5% to 9% by weight of combined magnesium calculated as magnesium oxide; and where the oxide is lead oxide, the reaction product may contain from about 25% to about 30% by weight based on the weight of the reaction product, the lead being calculated as PbO.

A wide variety of volatile organic solvents may be used. Among them are esters, ketones and aliphatic hydrocarbon solvents, e.g. methyl ethyl ketone, nonaromatic solvent naphtha, toluol, acetone, and mixtures of these with other solvents such as alcohol.

The adhesive is prepared by dissolving the polyvinyl alkyl ether in the selected volatile organic solvent in a conventional churn. Thereafter the reaction product is added either as a solid material or as an organic solvent solution. From about 20% to about 200% by weight of the reaction product based on the weight of the polyvinyl alkyl ether may be added depending upon the intended use of the adhesive or coating composition. Where the adhesive or coating is to be used to provide films associated with flexible materials it is preferred to use from about 20% to about 75% by weight of the reaction product. For association with rigid surfaces and to give the highest cold flow resistance up to about 200% of the reaction product based on the weight of the polyvinyl alkyl ether may be used. It is found also that the so-called open time of a deposited adhesive film is dependent on the percent of reaction product in the adhesive. That is, lower percentages of reaction product give compositions having relatively long open time during which the coating remains tacky and capable of forming bonds. Higher proportions of reaction product give compositions which may have an open time of as short as five minutes.

The compositions are capable of bonding leather, wood, paper, metal, synthetic resin material such as polystyrene foam, and so on.

The following examples are given as of assistance in understanding the invention but it is to be understood that the invention is not restricted to the specific materials, proportions or procedures of the examples:

*Example I*

10 parts of an oil soluble, heat reactive paratertiary butyl phenol formaldehyde resin having a melting point of 155° F., and a specific gravity of about 1.1, were dissolved in 100 parts of solvent. 2 parts by weight of freshly calcined magnesium oxide were added to the solution and the mixture was allowed to stand at room temperature with occasional stirring for 48 hrs. At this time it was found that the solution had changed from its initial color of amber to a reddish color. A portion of the material was evaporated to dryness and it was found that the residue had no melting point up to the temperature at which decomposition began. Testing of the residue for magnesium content gave a figure of 8% by weight calculated as magnesium oxide. The liquid was decanted to separate it from insoluble residue.

20 parts by weight of polyvinyl ethyl ether (EDBL) having a molecular weight of about 110,000 were added to the solution and the solution was agitated until the polyvinyl ethyl ether had dissolved.

A coating was brushed onto a roughed leather surface and a second roughed leather surface pressed down on the coating. After drying for 24 hours, the parts were strongly bonded together and could not be separated without tearing the leather.

Coatings of the composition were brushed on each of two wooden surfaces to be joined. The surfaces were allowed to dry for 20 minutes and then pressed firmly together. An immediate bond was formed.

*Example II*

15 parts by weight of the heat reactive butyl phenol formaldehyde resin of Example I were dissolved in 100 parts of a mixture of equal parts of methyl ethyl ketone and toluol. 3 parts by weight of freshly calcined magnesium oxide were stirred into the solution and the composition was allowed to stand with occasional stirring for 48 hours. The same color change was observed as in Example I.

The solution was decanted to remove insoluble material and there were then added 10 parts by weight of high molecular weight polyvinyl ethyl ether (molecular weight of about 100,000).

A portion of the resulting solution was brushed out on a glass surface and allowed to dry. The composition had dried tack free in less than five minutes and on standing overnight developed a hard glossy surface comparable to a nitrocellulose surface.

The solution was brushed onto a metal surface and a wood surface was immediately pressed against the film. The metal and wood pieces were held together for 24 hours at the end of which time a strong bond between them was established.

Having thus described our invention, what we claim as new and desire to secure by Letters Patent of the United States is:

1. A non-tacky heat-, and solvent-activatable adhesive and coating composition comprising a homogeneous mixture of a polyvinyl alkyl ether of which the alkyl group has from 2 to 4 carbon atoms and from about 20% to about 200% by weight based on the weight of the polyvinyl alkyl ether of an organic solvent soluble, substantially infusible product of reacting a metal oxide from the group consisting of magnesium oxide and lead oxide and a heat advancing oil-soluble alkali-catalyzed condensate of a para-substituted phenol, of which the substituent group is selected from the group consisting of alkyl and aryl hydrocarbons containing from three to six carbon atoms, and formaldehyde in proportion greater than one mol of formaldehyde to one mol of substituted phenol.

2. A non-tacky heat-, and solvent-activatable adhesive and coating composition comprising polyvinyl ethyl ether and from about 20% to about 200% by weight based on the weight of the polyvinyl ethyl ether of a solvent soluble, substantially infusible product of reacting a metal oxide from the group consisting of magnesium oxide and lead oxide and a heat advancing oil-soluble alkali-catalyzed condensate of a para-substituted phenol, of which the substituent group is selected from the group consisting of alkyl and aryl hydrocarbons containing from three to six carbon atoms, and formaldehyde in proportion greater than one mol of formaldehyde to one mol of substituted phenol, said product containing from about 7.5% to about 9% by weight of combined magnesium where the oxide is magnesium oxide and from 25% to about 30% of combined lead where the oxide is lead oxide, the percentages of oxides being calculated as the oxides.

3. A non-tacky heat-, and solvent-activatable adhesive and coating composition comprising polyvinyl ethel ether and from about 20% to about 200% by weight based on the weight of the polyvinyl ethyl ether of a solvent soluble, substantially infusible product of reacting magnesium oxide and a heat advancing oil-soluble alkali-catalyzed condensate of a para-substituted phenol, of which the substituent group is selected from the group consisting of alkyl and aryl hydrocarbons containing from three to six carbon atoms, and formaldehyde in proportion greater than one mol of formaldehyde to one mol of substituted phenol, said product containing from about 7.5% to about 9% by weight of combined magnesium, the percentages being calculated as magnesium oxide.

4. A liquid adhesive for forming a non-tacky heat-, and solvent-activatable film comprising a volatile organic solvent solution of polyvinyl ethyl ether and from about 20% to about 200% by weight based on the weight of the polyvinyl ethyl ether of a solvent soluble, substantially infusible product of reacting, before combination with said polyvinyl alkyl ether, magnesium oxide and a heat advancing oil-soluble alkali-catalyzed condensate of a para-substituted phenol, of which the substituent group is selected from the group consisting of alkyl and aryl hydrocarbons containing from 3 to 6 carbon atoms, and formaldehyde in proportion greater than one mol of formaldehyde to one mol of substituted phenol, said product containing from about 7.5% to about 9% by weight of combined magnesium calculated as magnesium oxide and said solvent being selected from the group consisting of esters, ketones and aliphatic hydrocarbons and mixtures of these with alcohol.

5. A liquid adhesive for forming a flexible non-tacky heat-, and solvent-activatable film comprising a volatile organic solvent solution of polyvinyl ethyl ether and from about 20% to about 75% by weight based on the weight of the polyvinyl ethyl ether of a solvent soluble, substantially infusible product of reacting before addition to said polyvinyl alkyl ether, magnesium oxide and a heat advancing oil-soluble alkali-catalyzed condensate of a para-substituted phenol, of which the substituent group is selected from the group consisting of alkyl and aryl hydrocarbons containing from 3 to 6 carbon atoms, and formaldehyde in proportion greater than one mol of formaldehyde to one mol of substituted phenol, said product containing from about 7.5% to about 9% by weight of combined magnesium calculated as magnesium oxide and said solvent being selected from the group consisting of esters, ketones and aliphatic hydrocarbons and mixtures of these with alcohol.

6. A liquid adhesive for forming a flexible non-tacky heat-, and solvent-activatable film consisting essentially of a volatile organic solvent solution of polyvinyl ethyl ether having a reduced viscosity of from about 3 to about 6 and from about 20% to about 75% by weight based on the weight of the polyvinyl ethyl ether of a solvent soluble, substantially infusible product of reacting before addition to said polyvinyl alkyl ether, magnesium oxide and a heat advancing oil-soluble alkali-catalyzed condensate of a para-substituted phenol, of which the substituent group is selected from the group consisting of alkyl and aryl hydrocarbons containing from 3 to 6 carbon atoms, and formaldehyde in proportion greater than one mol of formaldehyde to one mol of substituted phenol, said product containing from about 7.5% to about 9% by weight of combined magnesium calculated as magnesium oxide and said solvent being selected from the group consisting of esters, ketones and aliphatic hydrocarbons and mixtures of these with alcohol.

References Cited in the file of this patent

UNITED STATES PATENTS

| | | |
|---|---|---|
| 2,060,625 | Kranzlein et al. | Nov. 10, 1936 |
| 2,288,533 | Kreidl et al. | June 30, 1942 |
| 2,553,816 | Ebel | May 22, 1951 |

FOREIGN PATENTS

| | | |
|---|---|---|
| 722,805 | Great Britain | Feb. 2, 1955 |

OTHER REFERENCES

Ellis: The Chemistry of Synthetic Resins, Reinhold, New York, 1935, pages 436–437.